US012095219B2

(12) United States Patent

Wu

(10) Patent No.: US 12,095,219 B2

(45) Date of Patent: *Sep. 17, 2024

(54) WIRE TERMINAL BLOCK COUPLING SEPARATION MEMBER

(71) Applicants: DINKLE ENTERPRISE CO., LTD., New Taipei (TW); DINKLE ELECTRIC MACHINERY (CHINA) CO., LTD., Jiangsu (CN); LI YANG ELECTRIC MACHINERY (DONGGUAN) CO., LTD., Dong Guan (CN)

(72) Inventor: Shang-Tsai Wu, New Taipei (TW)

(73) Assignees: DINKE ENTERPRISE CO., LTD., New Taipei (TW); DINKLE ELECTRIC MACHINERY (CHINA) CO., LTD., Jiangsu (CN); LI YANG ELECTRIC MACHINERY (DONGGUAN) CO., LTD., Dong Guan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/379,552

(22) Filed: Oct. 12, 2023

(65) Prior Publication Data

US 2024/0039183 A1 Feb. 1, 2024

Related U.S. Application Data

(63) Continuation of application No. 17/718,091, filed on Apr. 11, 2022, now Pat. No. 11,855,404.

(51) Int. Cl.
*H01R 9/24* (2006.01)

(52) U.S. Cl.
CPC .................................... *H01R 9/24* (2013.01)

(58) Field of Classification Search
CPC ........... H01R 13/6271; H01R 13/6272; H01R 13/6273; H01R 13/6275; H01R 9/24
See application file for complete search history.

(56) References Cited

U.S. PATENT DOCUMENTS 5,820,399 A * 10/1998 Shirouzu ........... H01R 13/6275 439/352
6,572,400 B2 * 6/2003 Noguchi ............. H01R 13/641 439/489

(Continued)

*Primary Examiner* — Vanessa Girardi
(74) *Attorney, Agent, or Firm* — Chun-Ming Shih; HDLS IPR SERVICES

(57) ABSTRACT

A wire terminal block coupling separation member (1) is provided and includes an insulative housing (10), separation members (20) and conductive wire and terminal crimping members (30). The separation member (20) is secured to the insulative housing and includes a base (21) and a pressing mechanism (22) operably connected to the base (21). The pressing mechanism (22) includes a pressing portion (221) and a tail portion (222) extended outward from the pressing portion (221). The conductive wire and terminal crimping members (30) are arranged inside the insulative housing (10). When an acting force is exerted on the pressing portion (221), the pressing mechanism (22) generates deformation to drive the tail portion (222) to ascend. Accordingly, the pressing operation of the wire terminal block coupling separation member (1) is facilitated, and it is equipped with simple structure for easy installation.

5 Claims, 10 Drawing Sheets

(56) References Cited

U.S. PATENT DOCUMENTS

| | | | | |
|---|---|---|---|---|
| 6,896,540 | B1 * | 5/2005 | Wu | H01R 4/2433 439/417 |
| 7,780,466 | B1 * | 8/2010 | Wu | H01R 13/6275 439/354 |
| 10,367,271 | B1 * | 7/2019 | Wu | H01R 9/24 |
| 10,381,754 | B1 * | 8/2019 | Wu | H01R 13/6275 |
| 10,547,126 | B2 * | 1/2020 | Riku | H01R 13/50 |
| 2022/0344866 | A1 * | 10/2022 | Hwang | H01R 13/641 |

* cited by examiner

WIRE TERMINAL BLOCK COUPLING SEPARATION MEMBER

CROSS-REFERENCE TO RELATED APPLICATION

This application is a continuing application of U.S. patent application Ser. No. 17/718,091, filed on Apr. 11, 2022, and entitled "WIRE TERMINAL BLOCK COUPLING SEPARATION MEMBER". The entire disclosures of the above application are all incorporated herein by reference.

BACKGROUND

Technical Field

The technical field relates to a connector, and in particular, to a wire terminal block coupling separation member.

Description of Related Art

Terminal blocks are common connector components, and presently, terminal blocks have been widely used in industrial communication, industrial equipment, power industry and industrial control fields requiring vast amount of information transmission and processing. Terminal blocks are typically used to connect two or more sets of power cables, control cables or data transmission cables. For example, in an industrial control system, such as power supply, automatic power-off (APO) device, servo motor driver, tens to hundreds of terminal blocks are used in automatic or manual production in order to achieve diverse product types with frequent change of production processes while maintaining certain degree of flexibility, thereby adopting the most appropriate method to achieve the objective of highly efficient production capable of manufacturing small lot of products with diverse specifications.

A known terminal block includes two sets or more of power cables, control cables or data transmission cables coupled to one side thereof, and includes an attachment connector coupled to another side thereof, in order to achieve, such as, the purpose of signal transmission or power transmission. However, the coupling between the terminal block and the attachment connector is likely to be affected by vibration or other factors such that the contact between the attachment connector and the terminal block becomes improper, causing loose connection between the two, or even disengage and disconnection, such that each node fails to operate normally.

In view of the above, the inventor seeks to overcome the drawbacks associated with the known terminal block and aims to provide an effective solution through extensive researches along with utilization of academic principles and knowledge.

SUMMARY

An objective of the present disclosure is to provide a wire terminal block coupling separation member capable of facilitating its pressing operation and equipped with simple structure for easy installation.

To achieve the aforementioned objective, the present disclosure provides a wire terminal block coupling separation member, including an insulative housing, at least one separation member and a plurality of conductive wire and terminal crimping members. The insulative housing includes a seat and a plurality of insertion members extended outward from the seat, the seat include a recess, and the recess is arranged corresponding to one of the insertion members. The separation member is installed corresponding to the recess of the seat, and the separation member includes a base and a pressing mechanism operably connected to the base. The pressing mechanism includes a pressing portion and a tail portion extended outward from the pressing portion. Each one of the conductive wire and terminal crimping members is arranged inside the insulative housing. Accordingly, when an acting force is exerted on the pressing portion, the pressing mechanism generates a deformation to make the tail portion ascend.

The present disclosure can achieve at least the following technical effects and merits of having a compact structure, small size and facilitated engagement and disengagement operations.

DETAILED DESCRIPTION

The technical contents of the present disclosure will become apparent with the detailed description of embodiments accompanied with the illustration of related drawings as follows. It is intended that the embodiments and drawings disclosed herein are to be considered illustrative rather than restrictive.

Figure 1:
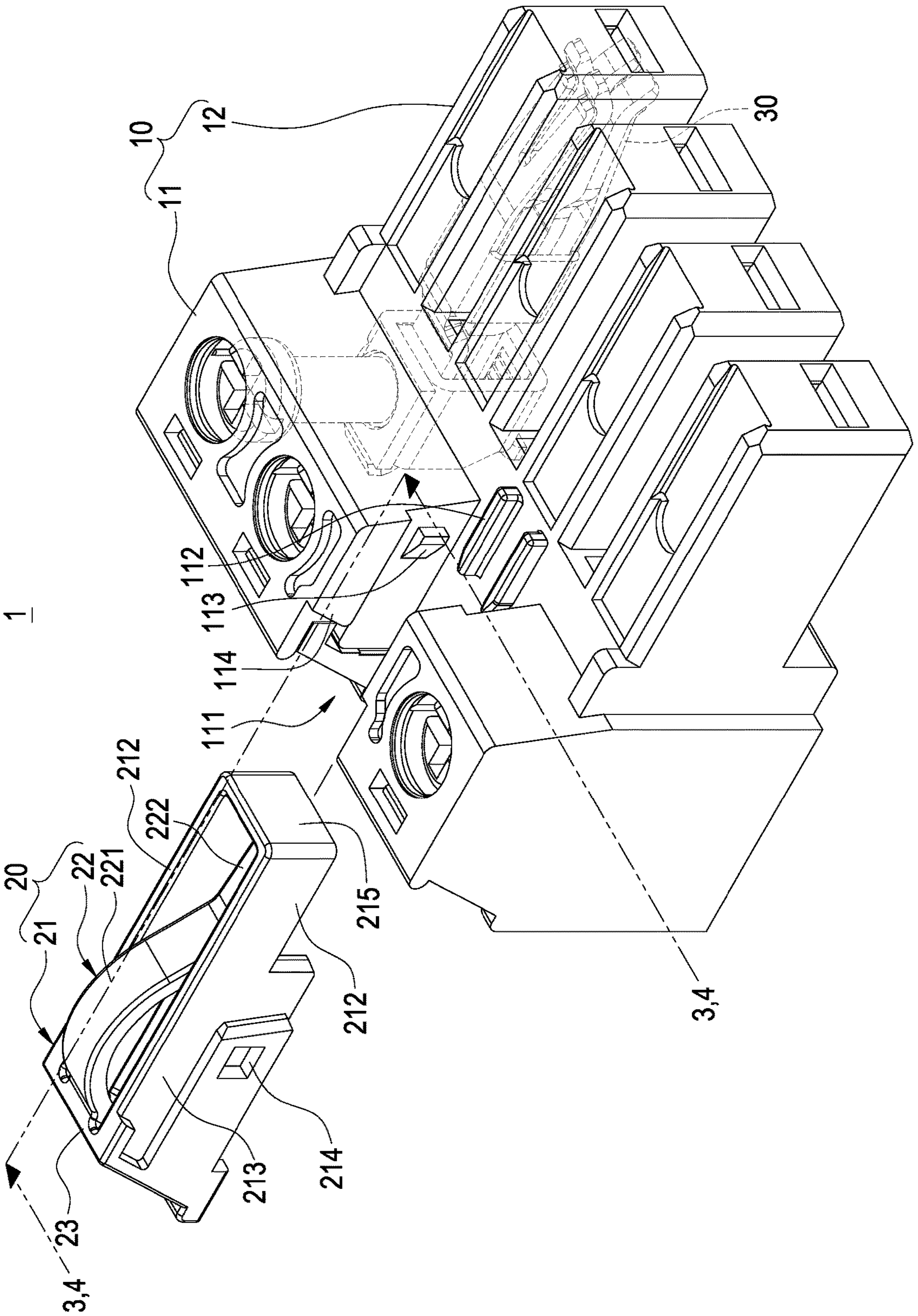
FIG. 1 is an exploded perspective view of the wire terminal block coupling separation member according to the first exemplary embodiment of the present disclosure.
Figure 2:
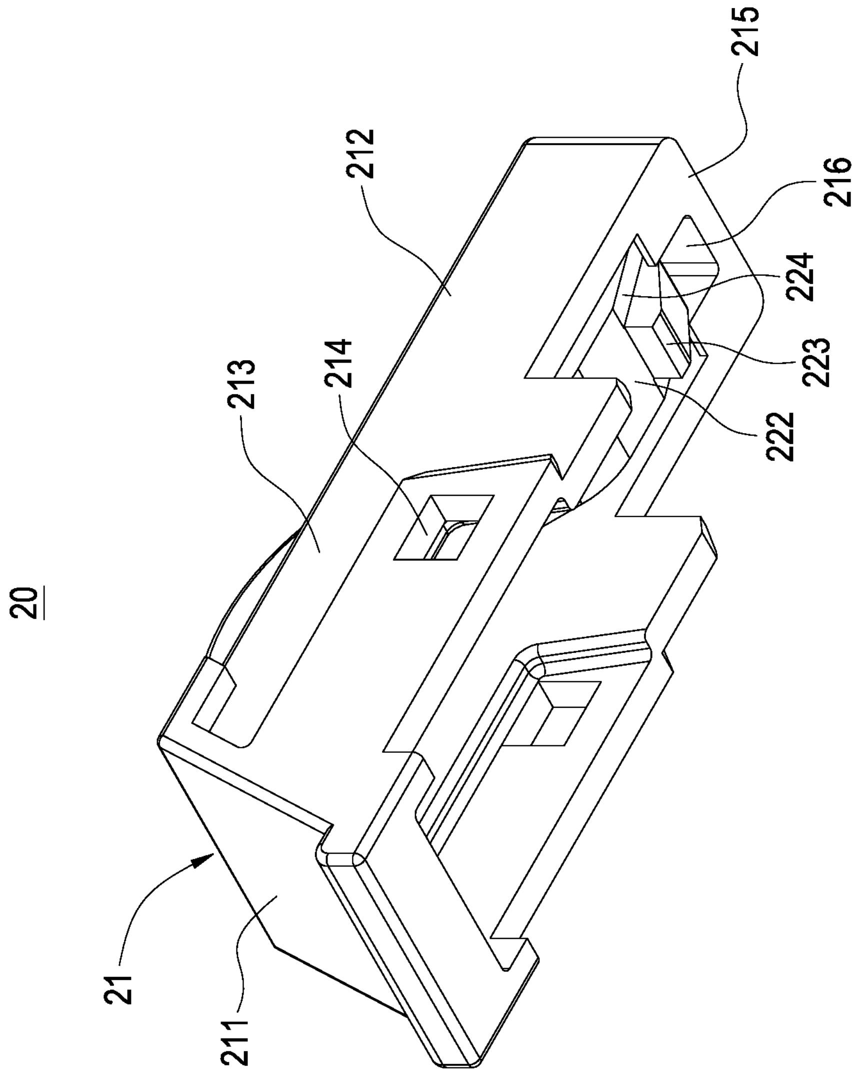
FIG. 2 is a perspective appearance view of the separation member of the present disclosure.
Figure 3:
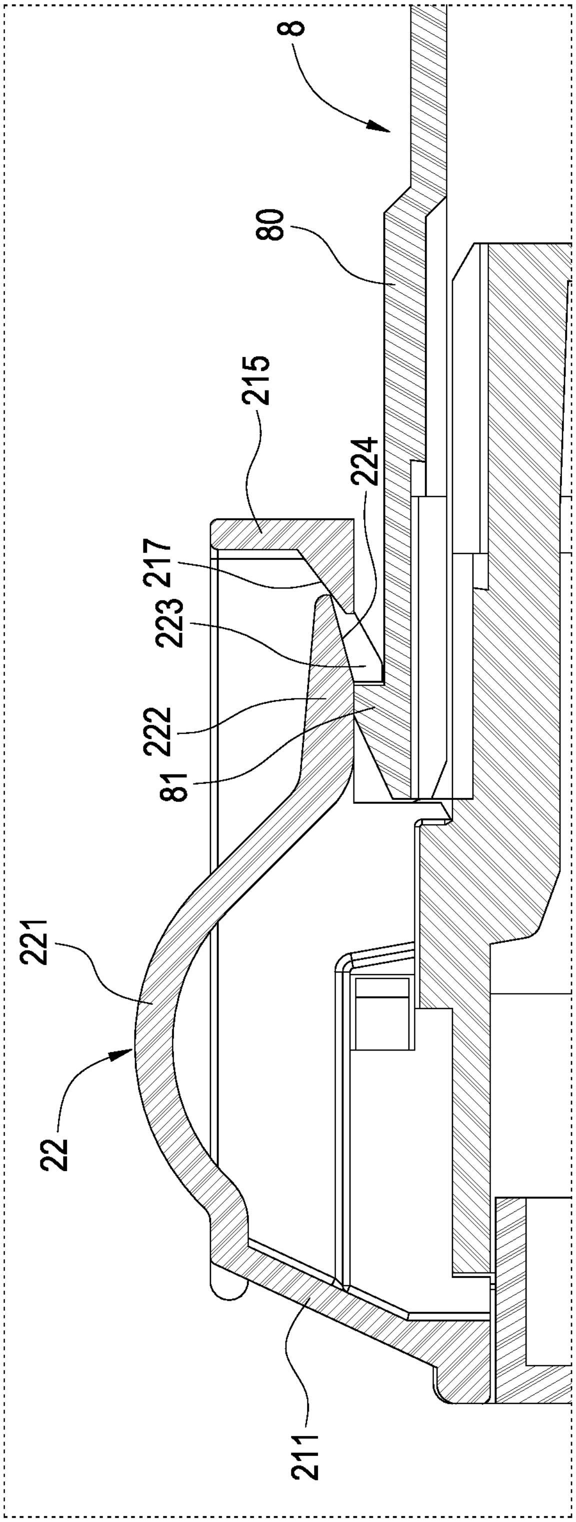
FIG. 3 is an assembly cross sectional view of the wire terminal block coupling separation member and the attachment connector according to the first exemplary embodiment of the present disclosure.

Please refer to FIG. 1 to FIG. 3. The present disclosure provides a wire terminal block coupling separation member 1, mainly includes an insulative housing 10, a separation member 20 and a plurality of conductive wire and terminal crimping members 30.

The insulative housing 10 mainly includes a seat 11 and a plurality of insertion members 12 extended from the seat 11. The internal of each one of the insertion members 12 respectively includes a conductive wire and terminal crimping member 30. Each one of the conductive wire and terminal crimping members 30 extends to the internal of the seat 11. In addition, the seat 11 includes a recess 111, and two guiding strips 112, two protrusions 113 and two securement strips 114 are formed inside the recess 111.

The separation member 20 is installed corresponding to the recess 111, and it mainly includes a base 21 and a pressing mechanism 22. In an exemplary embodiment, the base 21 mainly includes a front plate 211, two side plates 212 respectively connected to two ends of the front plate 211 and a rear plate 215 connected to each one of the side plates 212 and arranged correspondingly to the front plate 211. The inner surface of each side plate 212 is securely clamped by the corresponding guiding strip 112. The outer side of each side plate 212 includes an insertion slot 213 and a groove 214 formed thereon respectively. Each one of the insertion slots 213 is configured to receive the securement strip 114, and each one of the grooves 214 is configured to lock each one of the protrusions 113 in position respectively. A notch 216 is formed at a central location of the inner side of the rear plate 215. An ascending inclined surface 217 is respectively formed at two sides of the notch 216.

The pressing mechanism 22 is operably connected to the base 21, and it mainly includes a pressing portion 221 and a tail portion 222 extended from the pressing portion 221. The pressing mechanism 22 and the base 21 are integrally formed (or formed in one piece). The pressing portion 221 is an elastic member and is generally an arched sheet, and its one end away from the tail portion 222 is connected to the front plate 211. The lower side of the tail portion 222 includes a locking slab 223. The two sides of the locking slab 223 include a descending inclined surface 224 respectively formed thereon. In addition, the locking slab 223 is arranged corresponding to the notch 216, and the front edge of each descending inclined surface 224 abuts against the bottom end of the ascending inclined surface 217.

Figure 4:
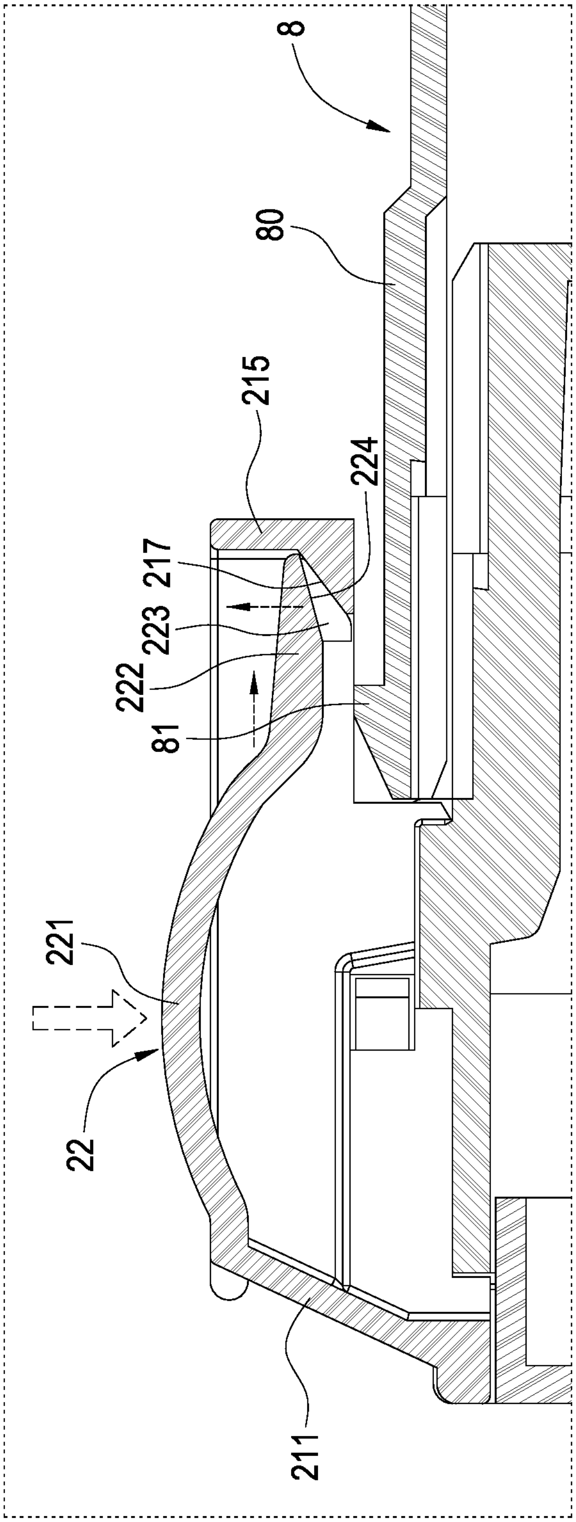
FIG. 4 is a cross sectional view of the wire terminal block coupling separation member in use state and the attachment connector according to the first exemplary embodiment of the present disclosure.
Figure 5:
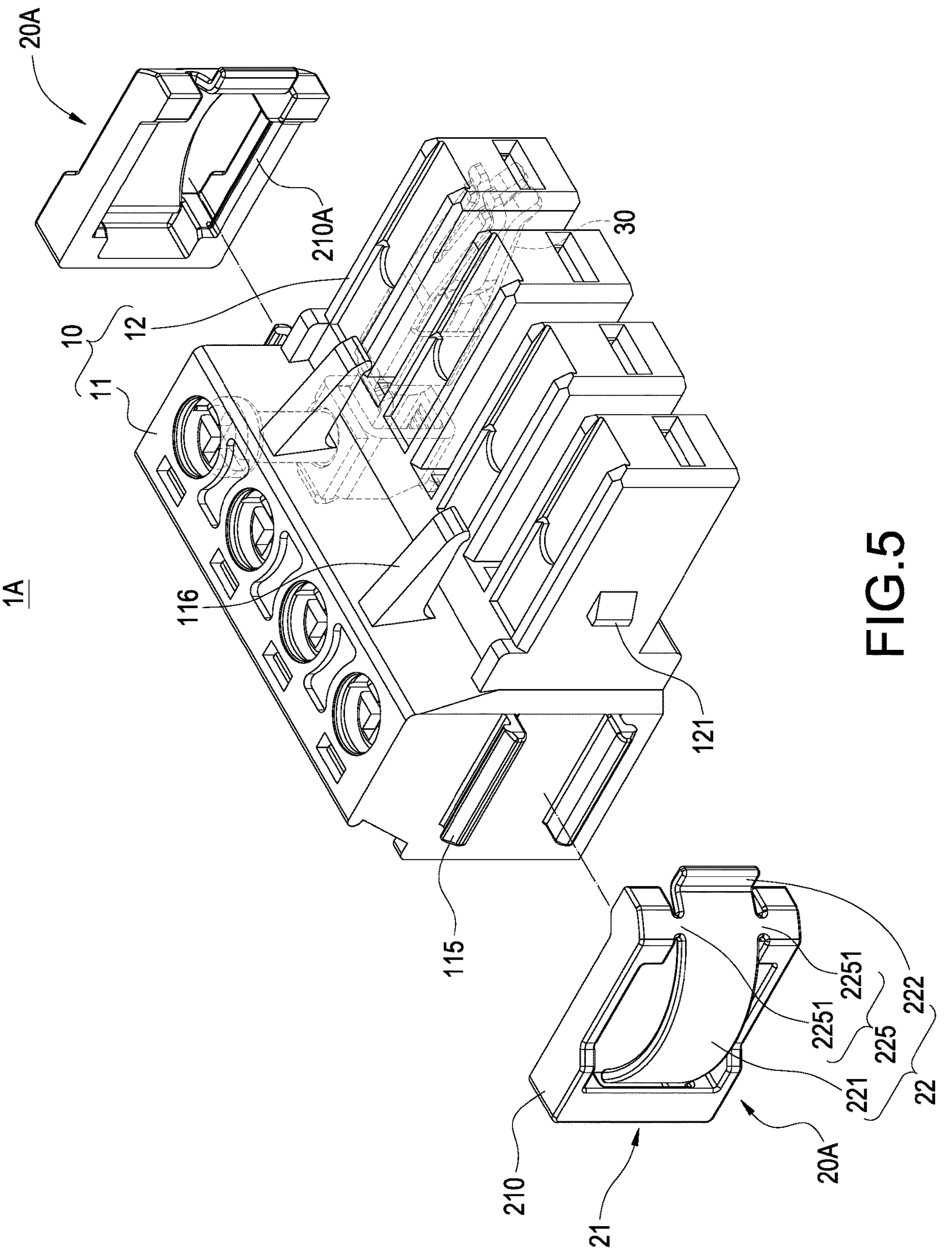
FIG. 5 is an exploded perspective view of the wire terminal block coupling separation member according to the second exemplary embodiment of the present disclosure.
Figure 6:
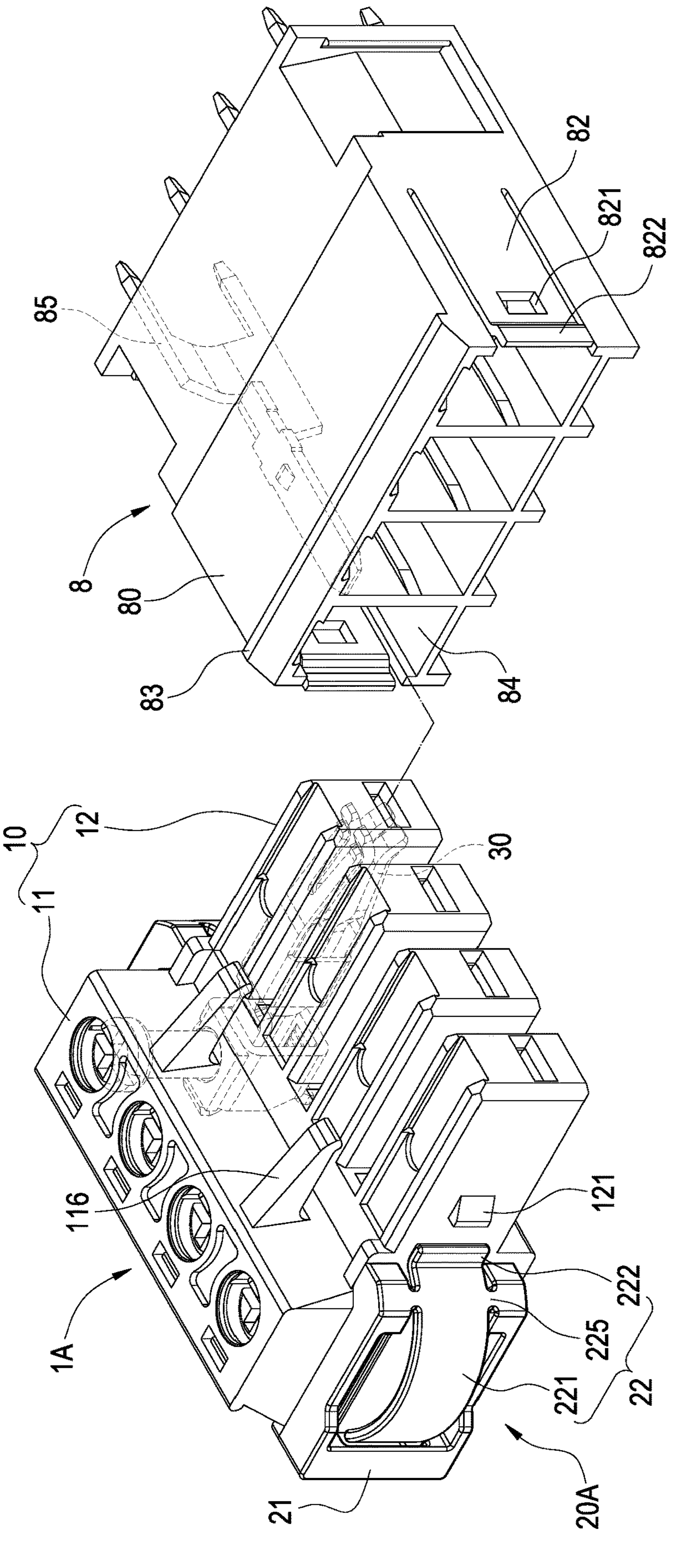
FIG. 6 is a perspective exploded view of the t wire terminal block coupling separation member and the attachment connector according to the second exemplary embodiment of the present disclosure.
Figure 7:
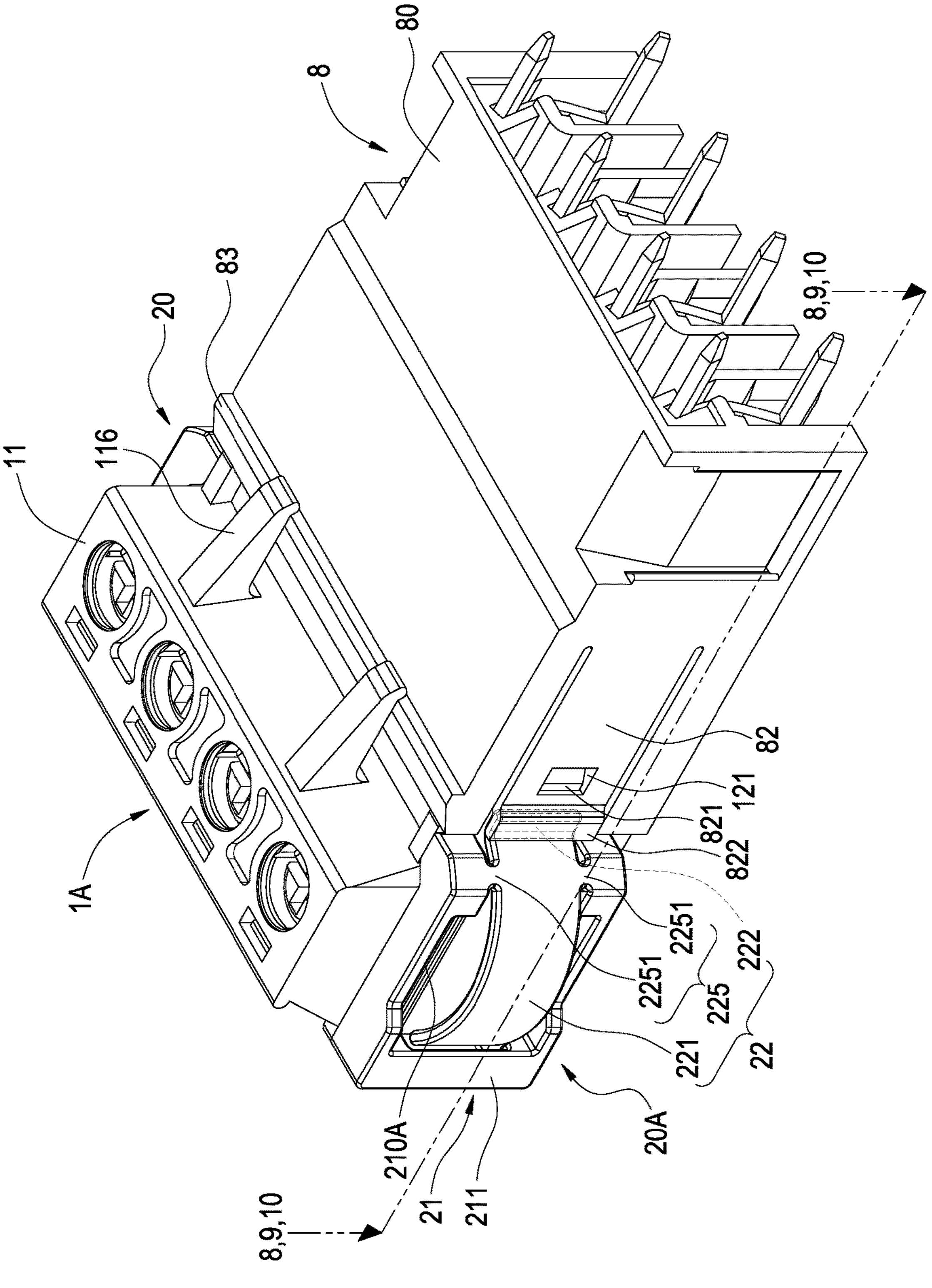
FIG. 7 is an assembly appearance view of the wire terminal block coupling separation member and the attachment connector according to the second exemplary embodiment of the present disclosure.
Figure 8:
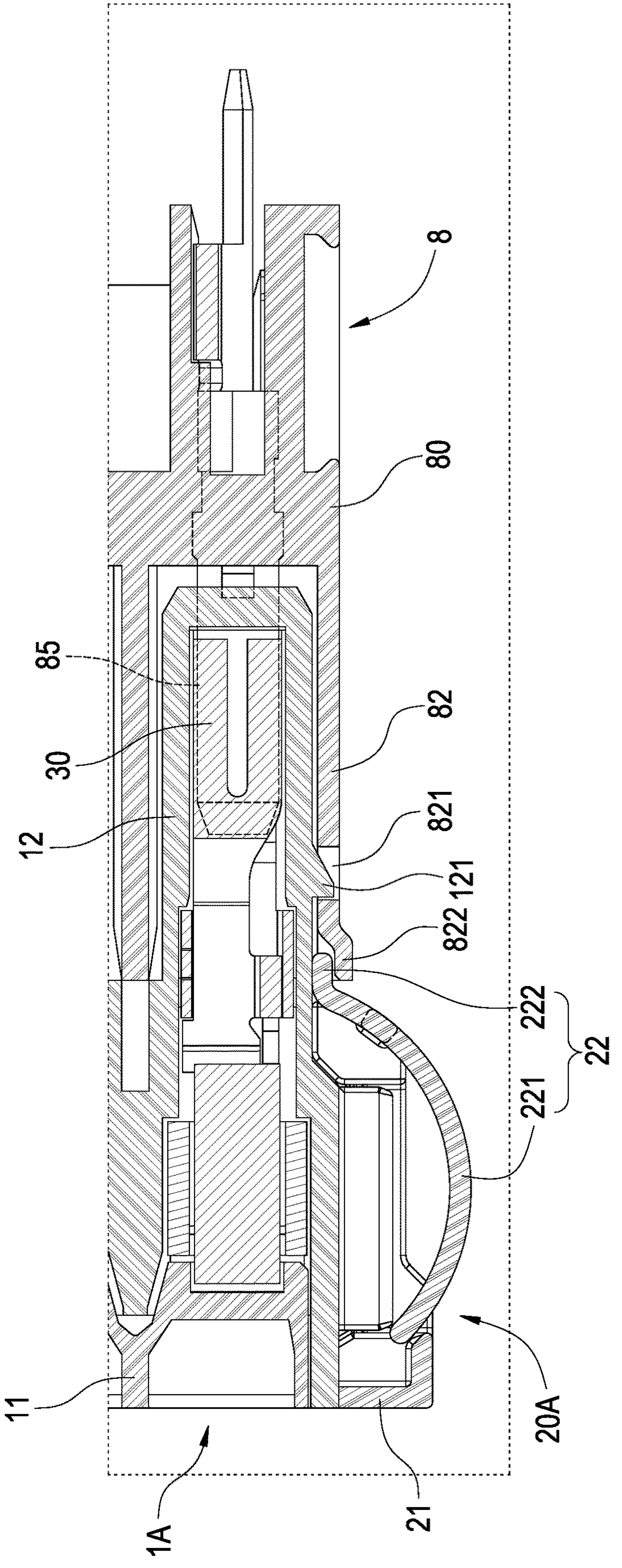
FIG. 8 is an assembly cross sectional view of the wire terminal block coupling separation member and the attachment connector according to the second exemplary embodiment of the present disclosure.

As shown in FIG. 4, the wire terminal block coupling separation member 1 of the present disclosure is provided to attach to an attachment connector 8. The attachment connector 8 includes a frame 80 and a buckle member 81 extended from the frame 80. When an acting force is exerted on the pressing portion 221, the pressing mechanism 22 generates a deformation. As each descending inclined surface 224 slidably contacts each ascending inclined surface 217, the tail portion 222 is lifted upward to allow the locking member 223 and the buckle member 81 to disengage.

Please refer to FIG. 5 to FIG. 8. The wire terminal block coupling separation member 1A according to an exemplary embodiment, mainly includes an insulative housing 10, two separation members 20A and a plurality of conductive wire and terminal crimping members 30.

The left-side and right-side surfaces of the seat 11 include two hooks 115 extended therefrom respectively, and the hooks 115 are arranged spaced apart from each other. In addition, one side of the seat 11 adjacent to the insertion member 12 respectively includes two hooking arms 116 extended therefrom. The hook arms 116 are also arranged spaced apart from each other and between any two adjacent insertion members 12. Furthermore, the outer surface of the insertion member 12 respectively includes a protrusion 121 extended therefrom.

Each separation member 20A is respectively installed at two sides of the insulative housing and each separation member 20A mainly includes a base 21 and a pressing mechanism 22. The pressing mechanism 22 is operably connected to the base 21, and the pressing mechanism 22 and the base 21 are integrally formed (or formed in one piece). In addition, the pressing mechanism 22 is a rigid member.

In an exemplary embodiment, the base 21 includes a U-shaped bracket 210. The internal of the two opposite sides of the U-shaped bracket 210 respectively includes a locking strip 210A. Each locking strip 210A is configured to lock and secure the hook 115.

The pressing mechanism 22 is operably connected to the base 21, and it mainly includes a pressing portion 221, a tail portion 222 extended from the pressing portion 221 and a rotating portion 225 formed between the pressing portion 221 and the tail portion 222. The pressing portion 221 is an arched sheet. In an exemplary embodiment, the rotating portion 225 includes two deformable sections 2251 respectively formed at two sides of the attachment area between the pressing portion 221 and the tail portion 223 and connected to the U-shaped bracket 210.

In an exemplary embodiment, the wire terminal block coupling separation member 1A is provided for attachment to an attachment connector 8. The attachment connector 8 includes a frame 80 and a plurality of conductive terminals 85. The frame 80 is made of a material of desirable insulation property, such as plastic. Two sides of the frame 80 include an elastic arm 82 respectively extended therefrom, and the elastic arm 82 includes a locking slot 821 and a toggling portion 822. Furthermore, the upper and lower surfaces of the frame 80 respectively include a locking strip 83 extended therefrom. Moreover, the frame 80 includes a plurality of insertion slots 84 formed at an internal thereof, and each conductive terminal 85 is installed at the internal of each insertion slot 84.

During assembly, each insertion member 12 is inserted into each insertion slot 84 correspondingly, and one end of each conductive terminal 85 is respectively clamped by the conductive wire and terminal crimping member 30 to achieve electrical connection. Another end of the conductive wire and terminal crimping member 30 is provided for a conductive wire (not shown in the drawings) to be inserted and fastened therein. In addition, the locking slot 821 of each elastic arm 82 is correspondingly locked and secured with the protrusion 121, and each hooking arm 116 is correspondingly locked and secured with the locking strip 83, thereby increasing the attachment stability. Furthermore, the toggling portion 822 of each elastic arm 82 abuts against the tail portion 222 of the pressing mechanism 22.

Figure 9:
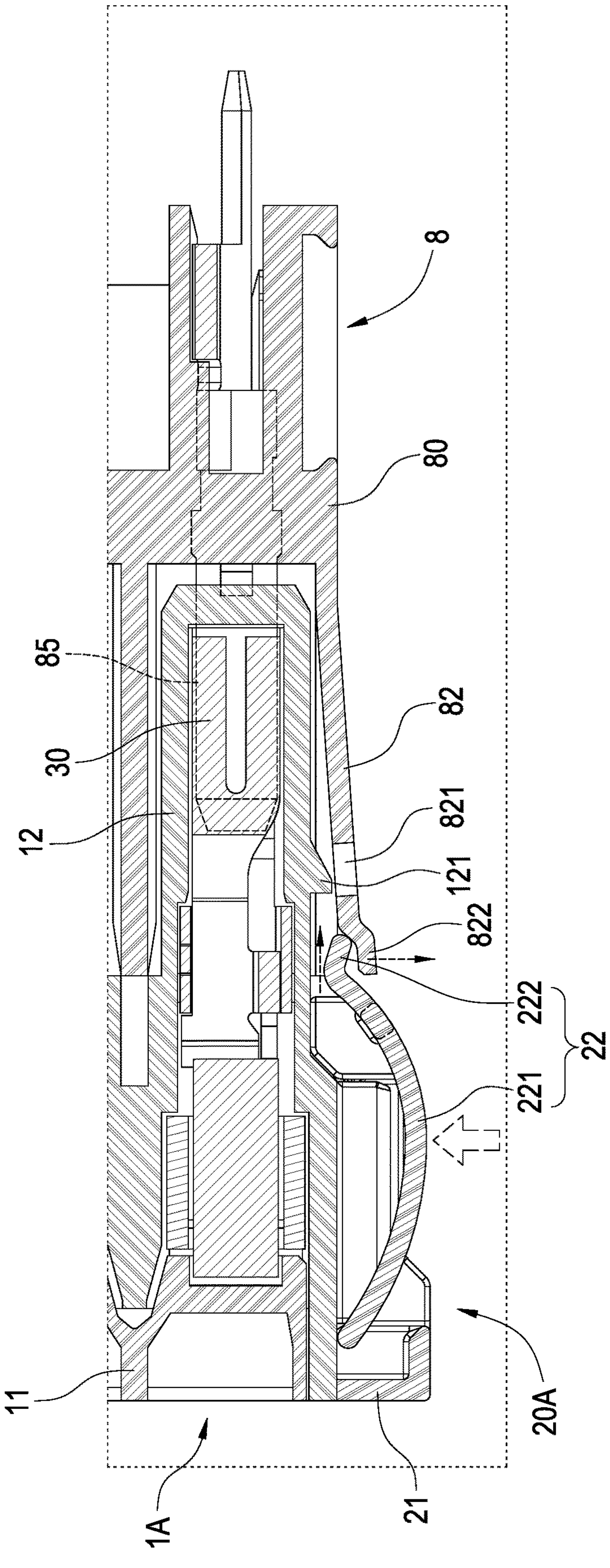
FIG. 9 is a cross-sectional view (1) of the wire terminal block coupling separation member in use state and the attachment connector according to the second exemplary embodiment of the present disclosure.
Figure 10:
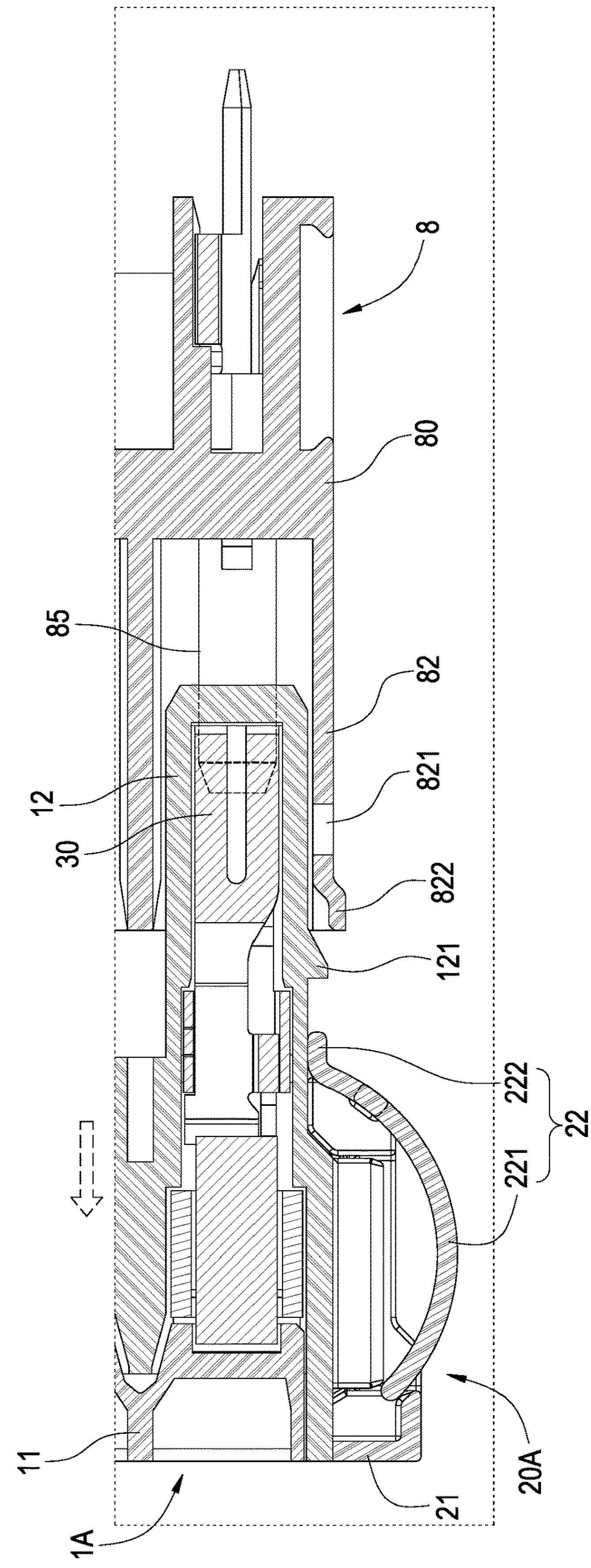
FIG. 10 is a cross-sectional view (2) of the wire terminal block coupling separation member in use state and the attachment connector according to the second exemplary embodiment of the present disclosure.

As shown in FIG. 9 and FIG. 10, during operation, when an acting force is exerted on the pressing portion 221, the pressing mechanism 22 generates rotations with the rotating portion 225 as the center of rotation and drives the tail portion 22 to lift upward, thereby allowing the protrusion 121 and the locking slot 821 to disengage.

In view of the above, the wire terminal block coupling separation member of the present disclosure can achieve the expected purpose of use and to overcome known drawbacks. In addition, the above description is provided to illustrate the exemplary embodiments of the present disclosure only such that it shall not be treated as limitation to the claimed scope of the present disclosure. In addition, any equivalent modification made based on the present disclosure shall be considered to within the claimed scope of the present disclosure.

What is claimed is:

1. A wire terminal block coupling separation member (1), comprising:

an insulative housing (10), comprises a seat (11) and a plurality of insertion members (12) extended outward from the seat (11), the seat (11) comprises a recess (111), and the recess (111) is arranged corresponding to one of the insertion members (12);

at least one separation member (20), installed corresponding to the recess (111) of the seat (11), the separation member (20) comprising a base (21) and a pressing mechanism (22) operably connected to the base (21), the pressing mechanism (22) comprising a convex pressing portion (221) and a tail portion (222) extended outward from the convex pressing portion (221), wherein the base (21) comprises a front plate (211) and a rear plate (215) disposed on opposite sides of the base (21), respectively, one end of the convex pressing portion (221) away from the tail portion (222) is connected to the front plate (211), and the tail portion (222) is adjacent to the rear plate (215); and a plurality of conductive wire and terminal crimping members (30), arranged inside the insulative housing (10);

wherein when an acting force is exerted on the convex pressing portion (221), the pressing mechanism (22) generates a deformation to make the tail portion (222) ascend and a distal end of the tail portion (222) slidably contacts the rear plate (215).

2. The wire terminal block coupling separation member (1) according to claim 1, wherein the pressing mechanism (22) and the base (21) are integrally formed, and the convex pressing portion (221) is an elastic member.

3. The wire terminal block coupling separation member (1) according to claim 1, wherein the base (21) further comprises two side plates (212) connected between the front plate (211) and the rear plate (215), the rear plate (215) comprises a notch (216) and an ascending inclined surface (217) respectively disposed at two sides of the notch (216), the tail portion (222) comprises a locking slab (223) and a descending inclined surface (224) respectively disposed at two sides of the locking slab (223), the locking slab (223) is arranged corresponding to the notch (216), and the descending inclined surface (224) slidably contacts the ascending inclined surfaces (217).

4. The wire terminal block coupling separation member (1) according to claim 3, wherein the seat (11) comprises a plurality of guiding strips (112) disposed in the recess (11), and each of the side plates (212) is securely clamped by each of the guiding strips (112) correspondingly.

5. The wire terminal block coupling separation member (1) according to claim 4, wherein the seat (11) further comprises a plurality of protrusions (113) and a plurality of securement strips (114) disposed in the recess (111), each of the side plates (212) comprises an insertion slot (213) and a groove (214) disposed thereon, the insertion slot (213) is configured to receive one of the securement strips (114), and the groove (214) is configured to lock one of the protrusions (113) in position.

* * * * *